United States Patent
Melby et al.

[11] Patent Number: 5,254,388
[45] Date of Patent: Oct. 19, 1993

[54] LIGHT CONTROL FILM WITH REDUCED GHOST IMAGES

[75] Inventors: Sanford Cobb Jr., Saint Mary's Po, Minn.; Leo A. Meyer; Jeffrey J. Melby; Scott G. Theirl, all of St. Paul, Minn.

[73] Assignee: Minnesota Mining and Manufacturing Company, St. Paul, Minn.

[21] Appl. No.: 820,611

[22] PCT Filed: Dec. 20, 1991

[86] PCT No.: PCT/US91/09724

§ 371 Date: Dec. 20, 1991

§ 102(e) Date: Dec. 20, 1991

Related U.S. Application Data

[63] Continuation-in-part of Ser. No. 632,123, Dec. 21, 1990, abandoned.

[51] Int. Cl.5 .............................................. B32B 3/00
[52] U.S. Cl. .................................. 428/120; 428/163; 428/167; 428/168; 428/170; 428/212; 428/218; 430/12; 430/23
[58] Field of Search ............... 428/120, 163, 167, 168, 428/170, 212, 218; 430/12, 23

[56] References Cited

U.S. PATENT DOCUMENTS

| | | | |
|---|---|---|---|
| Re. 27,617 | 4/1973 | Olsen | 161/6 |
| 3,653,138 | 4/1972 | Cooper | 40/130 R |
| 3,707,416 | 12/1972 | Stevens | 156/196 |
| 3,791,722 | 2/1974 | Ahlberg et al. | 351/45 |
| 3,919,559 | 11/1975 | Stevens | 250/508 |
| 3,922,440 | 11/1975 | Wegwerth et al. | 428/437 |
| 4,342,821 | 8/1982 | Galves et al. | 428/12 |
| 4,764,410 | 8/1988 | Grzywinski | 428/120 |
| 4,766,023 | 8/1988 | Lu | 420/120 |
| 4,788,094 | 11/1988 | Morita et al. | 428/136 |
| 4,815,821 | 3/1989 | Nonogaki et al. | 350/164 |

FOREIGN PATENT DOCUMENTS 0275205  7/1988  European Pat. Off.

Primary Examiner—Patrick J. Ryan
Assistant Examiner—Abraham Bahta
Attorney, Agent, or Firm—Gary L. Griswold; Walter N. Kirn; Stephen W. Buckingham

[57] ABSTRACT

A louvered plastic film has louvers including central regions with a relatively high coefficients of extinction and outer regions with relatively low coefficients of extinction. Such a film provides a dramatic reduction in ghost images.

30 Claims, 2 Drawing Sheets

LIGHT CONTROL FILM WITH REDUCED GHOST IMAGES

This is a continuation-in part of application, No. 07/632,123 filed Dec. 21, 1990, now abandoned.

BACKGROUND OF THE INVENTION

U.S. Pat. No. Re. 27,617 (Olsen) teaches a process of making a louvered light control film by skiving a billet of altercating layers of plastic having relatively lower and relatively higher optical densities. Upon skiving the billet, the pigmented layers serve as louver elements, which, as illustrated in the patent, may extend orthogonally to the resulting louvered plastic film. U.S. Pat. No. 3,707,416 (Stevens) teaches a process whereby the louver elements may be canted with respect to the surface of the louvered plastic film to provide a film which transmits light in a direction other than perpendicular to the surface of the film. U.S. Pat. No. 3,919,559 (Stevens) teaches a process for attaining a gradual change in the angle of cant of successive louver elements.

Among the uses for such louvered plastic films are lenses and goggles as shown in U.S. Pat. No. 3,791,722 (Ahlberg et al.), to be worn where high levels of illumination or glare are encountered. The film may also be used for transparent covering for a backlighted instrument panel, such as the instrument panel of an automobile, to minimize reflections from the windshield. A louvered plastic film may also be used to give a black and white photographic negative the appearance of a positive made from the negative as taught in U.S. Pat. No. 3,653,138 (Cooper).

U.S. Pat. No. 3,922,440 (Wegwerth et al.) points out that because louvered plastic films to are thin sheet materials: (1) they are not by themselves capable of structurally withstanding extreme stresses and (2) they are subject to distortion from physical stress and temperatures" (col. 1, lines 19-22). Furthermore, the skiving by which the louvered plastic films are produced results in irregular surfaces which seriously limits the optical quality of the film. Typically such films are, for practical purposes, translucent rather than transparent. Accordingly, as in Example 1 of that patent, the louvered plastic film usually is laminated under pressure between two clear plastic films of a material such as cellulose acetate butyrate, the material usually used in making louvered plastic films. Typically, the louvered plastic film is skived from the billet to a thickness between 0.1 and 0.4 mm and each of the outer plastic films has a thickness of between 0.1 and 0.3 mm. The ratio of the thickness of the skived film to the width of the clear regions will control the permitted view angle, with a greater ratio providing a narrower angle. Wegwerth's process of laminating louvered plastic films between two clear films requires an expensive press which is also expensive to operate. This is in part from the need to distribute heat uniformly and in part from the need to apply pressure with precision. Because the resulting laminates can not be larger than the platens of the press in which they are laminated, the press must be sufficiently large to produce the required size thus increasing the expense of the press.

U.S. Pat. Nos. 4,764,410 (Grzywinski) and 4,766,023 (Lu) teach alterative to the Wegwerth method. These alternative methods include the steps of (1) coating the skived louvered plastic film with a solventless monomer composition which polymerizes to an adhesive state or a hard state, respectively, upon exposure to radiation, (2) overlaying the monomer composition with a plastic film, and (3) exposing the coating to radiation to polymerize the composition. After polymerization the plastic liner which was placed over the monomer composition may be left in place to serve as protection for the louvered plastic film, or may be removed, leaving the polymerized composition exposed.

Such films are used for various purposes. One common use is to prevent light from automobile control panels from reaching the windshield and causing distracting and dangerous reflections at night. Another use is to cover the screen of a CRT or other display to prevent persons other than the operator from reading data displayed thereon.

A problem that is common to all of the louvered films described above, arises from the difference between the clear and dark layers. Typically the clear and dark layers are formed of the same material. A preferred material is cellulose acetate butyrate (CAB), although other materials may be used. The louvers are, however, rendered dark by the inclusion of very fine particles of another material. A preferred material is carbon black. If carbon black is used these particles have an average diameter of less than 0.1 $\mu$m. Thus they are much smaller than the wavelength of the light.

In spite of the small size of these particles, and, in fact, in part because of that size, the presence of the particles causes the index of refraction of the composite to be different from that of the plastic alone. Since the index of refraction of the clear and dark layers are different, light is reflected at the interface between the two. The effect of this reflection is the creation of "ghost" images. The percentage of the incident light that is reflected increases with increasing angle of incidence and increasing difference of index of refraction. For these purposes the angle of incidence is the angle between the ray of light and a normal to the interface between the clear and dark layers. As a result the ghost images of a typical film are most noticeable at angles between 5° and 25° from the axis of the louvers. Such ghost images are aesthetically displeasing, at best. Furthermore, if the film is to be used to cover a CRT screen or other display, the ghost images can cause misinterpretation of data and significantly contribute to operator fatigue.

One approach to elimination of the ghosting problem is to provide a matte finish on the interface between the clear and dark layers. This tends to eliminate distinct ghost images, but does not reduce the total amount of light reflected. Thus the ghost image is replaced by a blurred, but clearly visible, glow. In addition the creation of such a matte surface is very difficult in the currently preferred coextrusion processes wherein the clear and dark layers are extruded together in a single process.

An alternative approach is to reduce the amount of carbon black incorporated into the layers forming the louvers. In this case, the difference in index of refraction between the clear and dark layers is less than in the previously described film and thus reflections are reduced. However, if the louvers remain the same width as those with higher optical density, they will no longer meet opacity requirements. Thus, such films may not be used as privacy screens. Alternatively the louvers may be made wider to meet opacity requirements. This, however, will reduce the on-axis transmission through the louvered film to unacceptably low levels and/or make the louvers individually visible.

SUMMARY OF THE INVENTION

According to the invention, a louvered plastic film has a plurality of clear regions separated by louvers. Each louver has a central region with a relatively high coefficient of extinction and outer regions, adjacent said clear regions, having relatively low coefficients of extinction.

DETAILED DESCRIPTION OF A PREFERRED EMBODIMENT

The present invention overcomes the problems of the prior art by using louvers having an outer portion with a relatively low optical density and an inner portion having a relatively high optical density. Alternatively stated, the outer portions have a relatively lower coefficient of extinction and the inner region has a relatively higher coefficient of extinction. For these purposes the transmission through a medium is given by the formula $$T = 10^{-xd}$$

where T is the decimal fraction of light that is transmitted, x is the coefficient of extinction and d is the optical path length through the medium. In CAB with carbon black incorporated in the percentages contemplated in the invention, the coefficient of extinction is approximately equal to 4750C where C is the decimal fraction of carbon black in the film and the coefficient of extinction is expressed in inverse millimeters. In this case, d in the equation above would be expressed in millimeters.

A desirable film would have louvers in which each louver varied continuously from clear at its edges to very dark at its center. Creation of such graded optical density films would be very difficult, however. Therefore, a preferred embodiment uses a multilayer louver construction.

Figure 1:
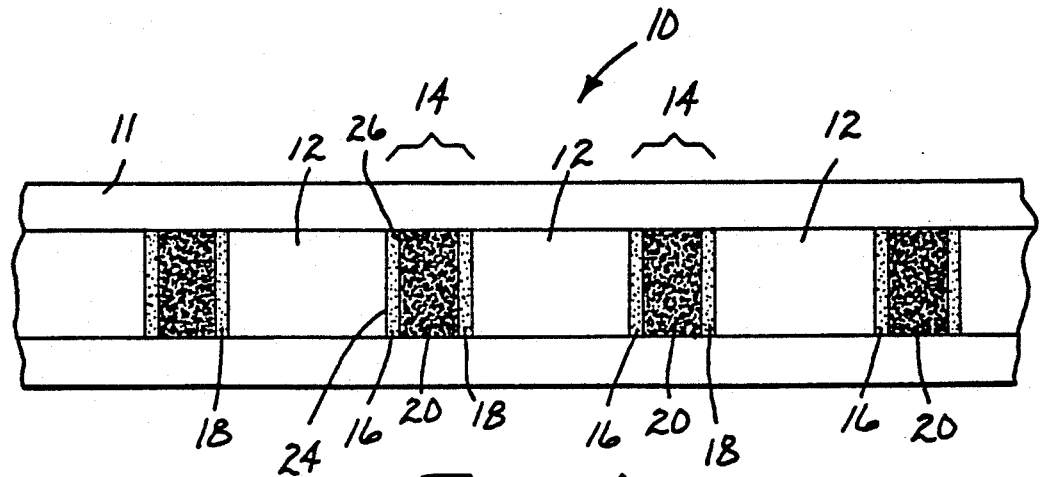
FIG. 1 is a schematic cross section of a louvered plastic film according to the invention.

FIG. 1 illustrates a louvered film 10 according to the present invention. It should be noted that FIG. 1 is an edge view of the film and that in normal use it would be viewed from an angle perpendicular to that of the Figure. Louvered film 10 has cover sheets 11 provided for clarification and includes alternating clear layers, such as layer 12 and louvers, such as louver 14. Louver 14, in turn, includes outer layers 16 and 18 and inner layer 20. Louver 14 will be described as containing carbon black, although other darkening agents could be used. Inner layer 20 includes a comparatively high concentration of carbon black in order to provide louver 14 with the required opacity. Outer layers 16 and 18 have carbon black, but in a lower concentration than that of layer 20. Thus, while they have a lower coefficient of extinction than layer 20, they also have an index of refraction that is closer to that of clear layer 12.

Figure 2:
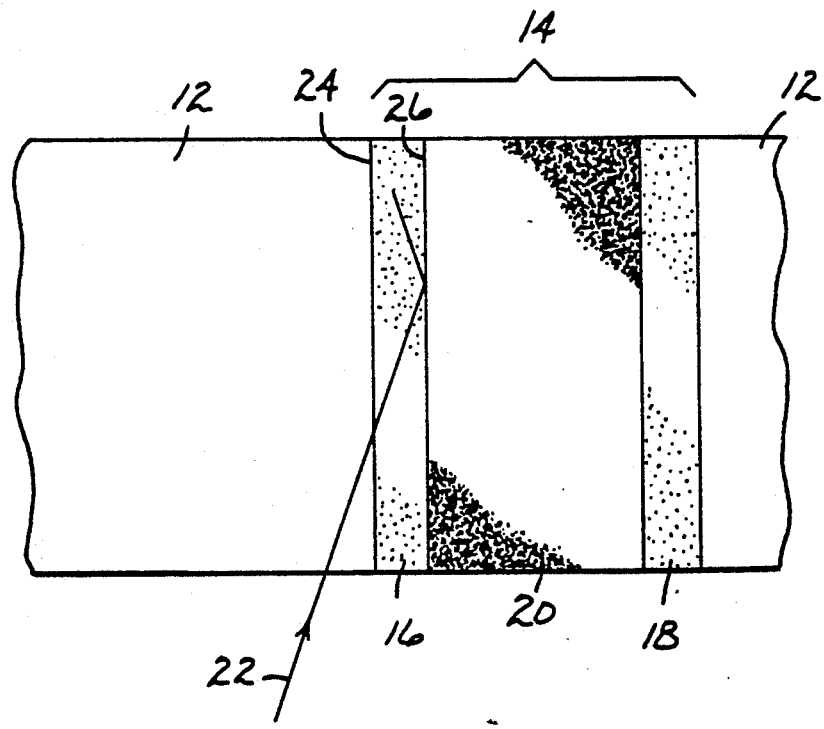
FIG. 2 is an enlarged drawing of a portion of the louvered plastic film of FIG. 1.

The operation of the louvers may be more clearly understood by reference to FIG. 2. FIG. 2 is an expanded view of a portion of clear layer 12 and louver 14. A light ray 22 enters transparent layer 12. It then strikes layer 16 at surface 24. Because layer 16 has only a low concentration of carbon black, there is not a large difference in index of refraction between it and layer 12. Therefore very little of the light is reflected by layer 24. Most of the light will enter layer 16 and be refracted. As the light traverses layer 16, some will be absorbed. Some, however, will strike layer 20 on surface 26. Some of light beam 22 will enter layer 20 where, due to the relatively high concentration of carbon black, it will be absorbed. Some of light beam 22 will be reflected at surface 26 due to the large difference in index of refraction between layer 16 and layer 20.

The advantage of the invention lies in the fact that the effective optical density of a medium is directly proportional to the distance that the light must travel through that medium and the fact that reflection at an interface between two materials with different indices of refraction increases with increasing angle of incidence. Thus, the light that is most likely to be reflected at the interface between layers 16 and 20 is the light that enters layer 16 at a grazing angle. Such light must travel a long distance through layer 16 both before and after reflection from surface 26 if it is to reemerge through surface 24. Therefore, the majority of light entering layer 16 will be absorbed even though layer 16 has only a comparatively light loading of carbon black.

To fully appreciate a film of the present invention, it should be compared with a prior art louvered film. In a typical prior art film, clear layers 0.0953 mm thick are separated by louvers with a thickness of 0.0114 mm. The clear regions and the louvers both are made primarily of CAB but the louvers further include 5 percent carbon black by weight. A simple calculation will show that the clear regions make up about 89 percent of such a film. In a preferred embodiment of the invention clear regions, such as clear region 12, are 0.0876 mm thick. The lightly loaded regions, such as layers 16 and 18, are 0.00445 mm thick, while the dark regions, such as layer 20, are 0.010 mm thick. Lightly loaded regions 16 and 18 include 0.75 percent carbon black by weight while heavily loaded region 20 includes 5 percent carbon black by weight. In such a film the clear regions make up about 86 percent of the film. Thus, such a film manufactured according to the invention will produce a dramatically reduced ghost image while covering a back-lit display, yet will provide only very slightly reduced on-axis transmission as compared to a film of the prior art. Ghost images could be further reduced by including additional intermediate layers between layers 16 and 20. For any given application the preferred construction will be determined by the acceptable amount of ghosting, the minimum acceptable on-axis transmission and acceptable difficulty of construction.

Although a wide variety of film parameters are possible within the scope of the invention, values within certain ranges are preferable in general, the lightly loaded outer portions of the louvers should be in the range of 0.12 to 1.0 percent carbon black by weight and the heavily loaded inner portion should be in the range of 1.5 to 10 percent carbon black by weight. For use with video displays the film should be between 0.08 and 0.6 mm thick. The clear regions should be between 0.05 and 0.25 mm wide, the outer regions of the louvers should be 0.0025 and 0.01 mm wide and the central regions of the louvers should be between 0.005 and 0.02 mm wide. In some situations more distant objects are to be viewed through a film. One such application is the use of a film as a sunscreen in the rear window of an automobile. In such situations thicker films with wider clear areas and louvers may be used and are often preferable. Therefore, more generally stated, the films should be between 0.08 and 1.5 mm thick, with clear regions having widths in the range of 0.05 to 1.0 mm. The louvers should have outer regions between 0.0025 and 0.015 mm wide and central regions 0.005 and 0.03 mm wide.

One embodiment that is not optimized for any particular application, but is useful in a wide variety of applications is made of CAB and has louvers having dark heavily loaded central regions that include 3 percent by weight carbon black and are 0.01 mm wide. The lightly loaded outer layers are 0.2 percent carbon black and are 0.0075 mm wide. The clear regions are 0.09 mm wide. The film thickness is preferably in the range of 0.15 mm to 0.5 mm. Thicker films will allow a lower range of viewing angles through the film. A preferred form of carbon black is available from Cabot Corporation under the name XC72.

A film according to the invention could be manufactured in a variety of ways. The most straight forward would be to manufacture layers 12, 16, 18 and 20 separately, stack them into a billet, repeating layers in the proper order and skive them as taught by the prior art. Extremely thin layers, especially layers such as 16, 18 and 20, are difficult to handle, however. In a preferred method of manufacture the layers are co-extruded. In order to do so the extruder must have three feeds and at least four outputs. Preferably the extruder would have five outputs. The extruder would then extrude a sheet that would run from the center of layer 12 to the center of the next transparent layer. It would include, therefore, half of two transparent layers as well as the two lightly loaded layers and one heavily loaded layer. Such sheets could then be stacked into a billet, heat-pressed and skived as taught by the art.

Figure 3:
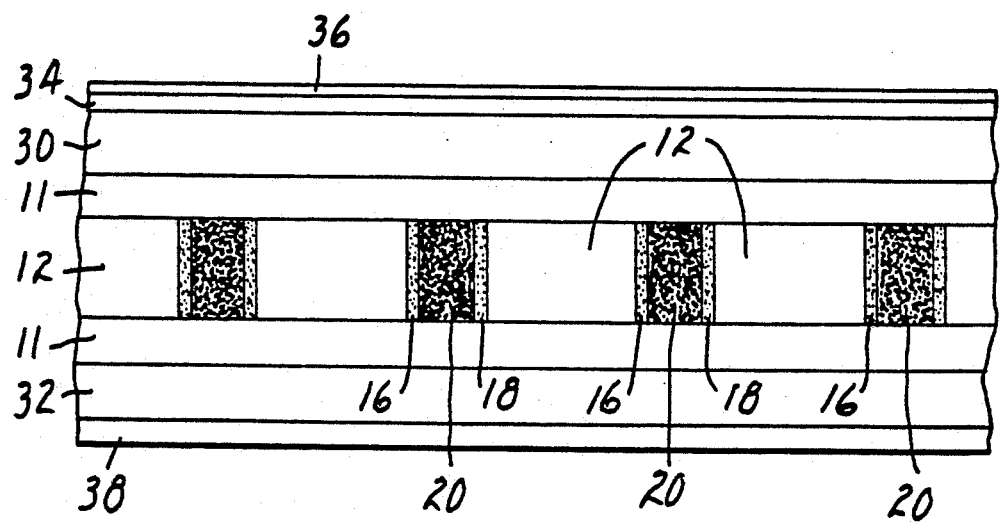
FIG. 3 is a schematic cross section of a privacy screen for a cathode ray using a louvered plastic film of the invention.

The present invention is particularly suited for use in privacy screens for CRT's. As explained previously, the reduction of ghost images in such screens significantly reduces operator fatigue. A privacy screen utilizing the louvered film of the invention is shown in FIG. 3. The privacy screen of the FIG. 3 includes clarifying cover sheets 11, clear regions 12, lightly loaded dark regions 16 and 18, and heavily loaded dark regions 20. Preferably cover sheets 11 are polyurethane films, clear regions 12 are CAB, and dark regions 16, 18, and 20 are CAB with carbon black. In addition, glass layers 30 and 32 are provided exterior to clarifying cover sheets 11. In a preferred method of manufacture, cover sheets 11 are placed on a louvered film and glass layers 30 and 32 are placed thereon. The entire structure is then autoclaved under pressure causing all five layers to heat laminate to one another. In practice, layers 34, 36, and 38, discussed below, would typically be applied to glass layers 30 and 32 prior to lamination.

A layer of an electrically conductive or semiconductive material is applied to one surface. A variety of materials may be used, but in a preferred embodiment layer 34 is a layer of indium tin oxide or a metal nitride that may be either sputtered or vacuum deposited onto glass layer 30. Preferably layer 34 has a thickness in the range of 300 to 600 angstroms. Preferably layer 34 is also a neutral density layer, although a separate neutral density layer could be provided or omitted altogether. Finally, antireflection layers 36 and 38 are provided. A detailed discussion of the theory and structure of antireflection coatings is provided by H. A. McCloud in *Thin Film optical Fibers*, Second Edition, 1986. Films that will work well as the neutral density conductive coat and the antireflective coat are available from Viratec Thin Films Inc. under the trade names NDAR and CDAR, respectively. An alternative neutral density conductive coating is available from the same source under the trade name TDAR.

To use the structure of FIG. 3 as a privacy filter, a section the size of the screen of the CRT on which the filter is to be placed is prepared. The filter is then placed in front of the CRT screen. In operation, antireflection coating 36 prevents glare resulting from reflection of ambient room light from the front of the privacy filter. Glass layers 30 and 32 provide stability as well as providing a surface on which a hard antireflective coat may be provided. Antireflection coat 38 prevents reflection of ambient light entering the system from the back surface of the privacy filter. This is particularly important because such light will pass through the louvered film a second time but displaced slightly from where it passed through the first time. As a result, the reflections of the louvers will not be precisely aligned with the actual louvers creating very distracting moiré patterns. By providing an efficient antireflective coating 38, such moiré patterns are avoided.

The remaining layer is conductive layer 34. It provides several functions. If it is at the lower end of the thickness range specified above, approximately 300 angstroms, it will have a resistivity of approximately 5000 ohms per square. With a resistivity in that range, it will prevent static electric build up on the privacy screen, thus helping to reduce the amount of dust collecting thereon. If the thickness is closer to the thicker range mentioned above, 600 angstroms, it will have a resistivity on the order of 500 ohms per square and will, in addition to prevent static build up, provide the terminal operator with shielding against electric fields. In addition, as mentioned above, layer 34 acts as a neutral density layer. A neutral density layer is one that absorbs a portion of the light traveling therethrough. Since the ambient light travels through the privacy filter, strikes the CRT screen and is reflected, and travels back through the privacy filter must travel through the neutral density filter twice, it will be attenuated twice. Thus, if the neutral density filter has a density of 50 percent, only 25 percent of the glare that would arise from the CRT screen itself will be present. Since the light emitted by the CRT travels through the neutral density filter only once, it is attenuated only by 50 percent. Thus, although reducing the effective output of the CRT, the neutral density filter increases the ratio of the CRT brightness to that of the glare.

One other factor that must be considered is the dot pitch of the CRT. If the width of clear regions 12 as well as the widths of the louvers are not carefully selected, moiré patterns will be visible to the user. One solution to this is to carefully adjust the width of these regions for use with a particular CRT. A problem with this is that CRT's currently available on the market have a wide variety of dot pitches and the available pitches are changing rapidly as screen resolutions are being improved. An alternative solution is to make a single set of louver spacings, but to rotate the louvered film slightly so that the louvers run 10 to 14 degrees from the vertical. Since the louvers are no longer running parallel to the rows of phosphors, the problem of moiré patterns is greatly reduced.

EXAMPLE

In order to test the invention, a sample film was manufactured. This sample had louvers including a reduced concentration layer on one side only. Thus, the strength of the ghost image on the side without a reduced concentration layer represented those of the prior art while the ghost image on the side with the reduced concentration layer represented that of a film of the invention. Specifically, the film included a louvered film that was 0.375 mm thick. Cover sheets with a thickness of 0.25 mm were press laminated to each major surface for clarification. The clear layers were 0.175 mm wide and each louver consisted of a 0.007 mm layer that include 0.6 percent carbon black by weight and a 0.011 mm layer that included 5 percent carbon black by weight.

A light box with a 25 mm aperture was set up in a darkened room. The sample film was positioned 1.2 m from the light box. A Spectra Prichard photometer was set to have a 6 minute aperture and positioned on the opposite of the film from the light box. The film was positioned on an adjustable slide so that it could be moved perpendicular to the line connecting the light box and the photometer. The slide was mounted so that the film could be rotated about an axis parallel to the louvers. The image brightness was measured at a variety of angles to the normal to the film on both the side where the 5 percent layer was exposed and the side where the 0.6 percent layer was exposed. The measurement was made in Foot Lamberts. The results of these measurements are summarized in the table below.

| Incident Angle of Light | Ghost Image Brightness (Foot Lamberts) | |
| --- | --- | --- |
| (Degrees) | 5% Side | 0.6% Side |
| 5 | 2.7 | 0.34 |
| 10 | 1.7 | 0.10 |
| 15 | 0.87 | 0.05 |
| 20 | 0.43 | 0.04 |
| 25 | 0.26 | 0.03 |

We claim:

1. A louvered plastic film comprising a plurality of clear regions separated by louvers wherein each of said louvers has a central region having a first coefficient of extinction and an outer region adjacent said clear region having a second coefficient of extinction, said first coefficient of extinction being at least 1.5 times said second coefficient of extinction.

2. The louvered plastic film of claim 1 wherein said louvers are of a clear material with a light absorbing material incorporated therein.

3. The louvered plastic film of claim 2 wherein said light absorbing material is carbon black.

4. The louvered plastic film of claim 2 wherein both said clear regions and said louvers are of cellulose acetate butyrate.

5. The louvered plastic film of claim 4 wherein said light absorbing material is carbon black.

6. The louvered plastic film of claim 5 wherein said outer regions of said louvers are in the range 0.12 to 1.0 percent by weight carbon black.

7. The louvered plastic film of claim 4 wherein said central regions of said louvers are in the range 1.5 to 10.0 percent by weight carbon black.

8. The louvered plastic film of claim 1 wherein said film has a thickness in the range 0.08 mm to 1.5 mm.

9. The louvered plastic film of claim 8 wherein said clear regions have widths in the range 0.05 mm to 1.0 mm.

10. The louvered plastic film of claim 8 wherein said outer regions of said louvers have widths in the range 0.0025 mm to 0.015 mm.

11. The louvered plastic film of claim 8 wherein said central regions of said louvers have widths in the range 0.005 mm to 0.03 mm.

12. The louvered plastic film of claim 8 wherein said louvers are of a clear material with a light absorbing material incorporated therein.

13. The louvered plastic film of claim 12 wherein both said clear regions and said louvers are of cellulose acetate butyrate.

14. The louvered plastic film of claim 13 wherein said light absorbing material is carbon black.

15. The louvered plastic film of claim 14 wherein said clear regions have widths in the range 0.05 mm to 1.0 mm, said outer regions of said louvers have widths in the range 0.0025 mm to 0.015 mm and said central regions of said louvers have widths in the range 0.005 mm to 0.03 mm.

16. The louvered plastic film of claim 15 wherein said outer regions of said louvers are in the range 0.12 to 1.0 percent by weight carbon black and said central regions of said louvers are in the range 1.5 to 10.0 percent by weight carbon black.

17. The louvered plastic film of claim 15 wherein said film has a thickness in the range 0.08 mm to 0.6 mm, said clear regions have widths in the range 0.05 mm to 0.25 mm, said outer regions of said louvers have widths in the range 0.0025 mm to 0.01 mm and said central regions of said louvers have widths in the range 0.005 mm to 0.02 mm.

18. The louvered plastic film of claim 17 wherein said outer regions of said louvers are in the range 0.12 to 1.0 percent by weight carbon black and said central regions of said louvers are in the range 1.5 to 10.0 percent by weight carbon black.

19. A louvered plastic film according to claim 1 further comprising an antireflection coating.

20. A louvered plastic film according to claim 1 wherein said film has first and second major surfaces and said first major surface has a layer of glass adhered thereto.

21. A louvered plastic film according to claim 20 wherein said glass has an antireflection coating.

22. A louvered plastic film according to claim 20 wherein said second major surface has a layer of glass adhered thereto.

23. A louvered plastic film according to claim 22 wherein said layer of glass adhered to said second major surface has a neutral density coating.

24. A louvered plastic film according to claim 22 wherein said layer of glass adhered to said second major surface has an electrically conductive coating.

25. A louvered plastic film according to claim 24 wherein said electrically conductive coating has an electrical resistivity of less than 5000 Ohms per square.

26. A louvered plastic film according to claim 25 wherein said electrically conductive coating has an electrical resistivity of less than 500 Ohms per square.

27. A louvered plastic film according to claim 24 wherein said electrically conductive coating also serves as a neutral density coating.

28. A louvered plastic film according to claim 24 wherein said electrically conductive coating has an antireflection coating.

29. A louvered plastic film according to claim 28 wherein said layer of glass adhered to said first major surface has an antireflection coating.

30. A privacy screen for use with a cathode ray tube display said screen comprising louvered plastic film having a plurality of clear regions separated by louvers wherein each of said louvers has a central region having a relatively high coefficient of extinction and outer regions adjacent said clear regions having relatively low coefficients of extinction.

* * * * *